United States Patent [19]

Ripberger

[11] Patent Number: 5,502,811
[45] Date of Patent: Mar. 26, 1996

[54] SYSTEM AND METHOD FOR STRIPING DATA TO MAGNETIC TAPE UNITS

[75] Inventor: Richard A. Ripberger, Tucson, Ariz.

[73] Assignee: International Business Machines Corporation, Armonk, N.Y.

[21] Appl. No.: 129,228

[22] Filed: Sep. 29, 1993

[51] Int. Cl.$^6$ ............................................. G06F 11/34
[52] U.S. Cl. ............................. 395/182.04; 395/438
[58] Field of Search ........................... 395/575, 425, 395/400, 40.1, 51.1, 182.04, 185.07, 404, 427, 438; 360/18, 47, 48; 364/247.7; 371/40.1

[56] References Cited

U.S. PATENT DOCUMENTS

| | | | |
|---|---|---|---|
| 3,704,363 | 11/1972 | Salmassy et al. | |
| 3,831,197 | 8/1974 | Beach et al. | |
| 3,931,639 | 1/1976 | Arter et al. | |
| 4,092,732 | 5/1978 | Ouchi | 364/900 |
| 4,141,045 | 2/1979 | Sheehan | 360/15 |
| 4,298,897 | 11/1981 | Arter et al. | 360/39 |
| 4,310,883 | 1/1982 | Clifton et al. | 364/200 |
| 4,642,705 | 2/1987 | Lemelson | 360/18 |
| 4,722,085 | 1/1988 | Flora et al. | 371/40.1 |
| 4,729,044 | 3/1988 | Kiesel | 360/14.3 |
| 4,775,978 | 10/1988 | Hartness | 371/40.1 |
| 4,802,032 | 1/1989 | Tatsuzawa et al. | 360/19.1 |
| 5,136,146 | 8/1992 | Anglin et al. | 235/441 |
| 5,276,867 | 1/1994 | Kenley et al. | 395/600 |

FOREIGN PATENT DOCUMENTS

| | | | |
|---|---|---|---|
| 1014664 | 7/1977 | Canada. | |
| 57-98167 | 6/1982 | Japan | G11B 27/02 |
| 211805 | 9/1986 | Japan | G11B 5/09 |
| 63-14390 | 1/1988 | Japan | G11B 27/02 |
| 0264814 | 3/1990 | Japan | G06F 12/00 |

OTHER PUBLICATIONS

IEEE Proceedings, 26 Apr. 1993, A. L. Drapeau et al., "Striped Tape Arrays" pp. 259, 265.
IBM Technical Disclosure Bulletin, vol. 36, No. 3, Mar. 1993 "Tape Array Storage System" Entire Document.

*Primary Examiner*—Robert W. Beausoliel, Jr.
*Assistant Examiner*—Albert Decady
*Attorney, Agent, or Firm*—Manny W. Schecter; Andrew J. Dillon

[57] ABSTRACT

A plurality of removable volumes for magnetic tape units are used as array for the storage of data. First an array of removable volumes is mounted on the magnetic tape units. Then each removable volume of the array is accessed at equivalent logical locations for storage or retrieval of the data file. Responsive to access of the array, data for the data file is striped to the removable volumes of the array beginning at the equivalent location on each removable volume. Depending upon the striping format, null marks may be striped to the removable volumes receiving fewer data than other volumes. This maintains the equivalent logical location for the start of the next file.

18 Claims, 7 Drawing Sheets

SYSTEM AND METHOD FOR STRIPING DATA TO MAGNETIC TAPE UNITS

BACKGROUND OF THE INVENTION

1. Technical Field

The invention relates to storage and recovery of data on magnetic tape units and, more particularly, to application of array techniques to removable media data storage systems to improve data throughput and reliability. Still more particularly, the invention relates to management of and data organization on removable media volumes to support array operation.

2. Description of the Related Art

Redundant array, inexpensive disk (RAID) systems are well known for improving data rates and, with use of redundant data, storage reliability. RAID systems are implemented with a plurality of hard drive disk systems. The drives are typically synchronized to allow data to be divided among and written to the drives along parallel channels. This is called data striping. In theory, a RAID system is faster than single drive systems by a factor equal to the number of non-redundant data disk drives used in the array, because of the wider bandwidth made available by use of parallel channels.

Data striping in itself does not improve reliability, because there is increased exposure to failure of any one disk drive when an array of drives is in use. However, error correcting codes, parity information, or both, can be used to make a RAID system which is tolerant of failure of one or more disk drives within the array. In these systems one or more of the drives in the array is used strictly for storage of redundant data. These redundant drives may carry parity information, which when combined with an error signal generated using error correcting code on a failing non-redundant drive, or an error signal resulting from simple failure of a non-redundant drive, may be used to regenerate the data on the failing non-redundant drive. See, for example, U.S. Pat. No. 4,775,978 to Hartness. Alternatively a plurality of redundant drives may be used for error correcting code which may be used directly to recover missing data. See U.S. Pat. No. 4,722,085 to Flora et al.

Where magnetic tape units are used for archival backup of RAID systems it would be desirable to match the bandwidth of the RAID system into the magnetic tape units. Most RAID concepts are not inherently limited to disk drives and can be applied to a group of magnetic tape units to broaden bandwidth for write and read operations. However, direct application of RAID controller processes to arrays of magnetic tape units, or other devices using removable media, raises potential pitfalls which, if unaddressed, could result in complete loss of data files.

In a magnetic tape unit the storage media is virtually always removable and replaceable. Volumes, e.g. mountable tape cassettes, must be tracked and control units and accessors advised of correct volumes when data is accessed. Thus there is not an array of magnetic tape units as such, but rather an array of volumes available for mounting on the magnetic tape units.

It is characteristic of RAID systems that the storage media is nonremovable. This allows operation of the disk drive base RAID to be made transparent to a host. In other words, a RAID system appears to a computer to be a single disk drive. The volumes used with magnetic tape units cannot be hidden from a host computer and thus an array of volumes mounted on magnetic tape units cannot operate as a single logical device. Volumes must be tracked to assure correct mounting and storage, and design fail-safe procedures should be provided to recover from incorrect mounting of volumes. Some method of handling volume control information distinct from user data information must be provided. Handling media defects for tape volumes is more complicated than for hard disk drives in that the defect map for a given magnetic tape unit can change with each remount of volume on the unit. Finally, magnetic tape units are sequential access rather than direct access devices, raising issues relating to tracking associated blocks of data after striping.

SUMMARY OF THE INVENTION

It is therefore one object of the invention to provide an improved method of storage and recovery of data on magnetic tape units.

It is another object of the invention to provide a system and method for application of array techniques to magnetic tape units to improve data throughput and reliability in recovery.

It is yet another object of the invention to provide a system and method for management of removable media volumes for the magnetic tape units to support array operation.

The foregoing objects are achieved as is now described. A plurality of removable volumes for magnetic tape units are used as an array for the storage of data. First an array of removable volumes is mounted on the magnetic tape units. Then each removable volume of the array is accessed at equivalent logical locations for storage or retrieval of the data file. Responsive to access of the array, data for the data file is striped by packets to the removable volumes of the array beginning at the equivalent location on each removable volume, or unstriped in case of a read operation. Null marks are striped to the removable volumes receiving fewer packets of data where the number of packets of data for the data file is not evenly divisible by the number of volumes receiving striped data. This simplifies data requirements for appropriate positioning of the volumes.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
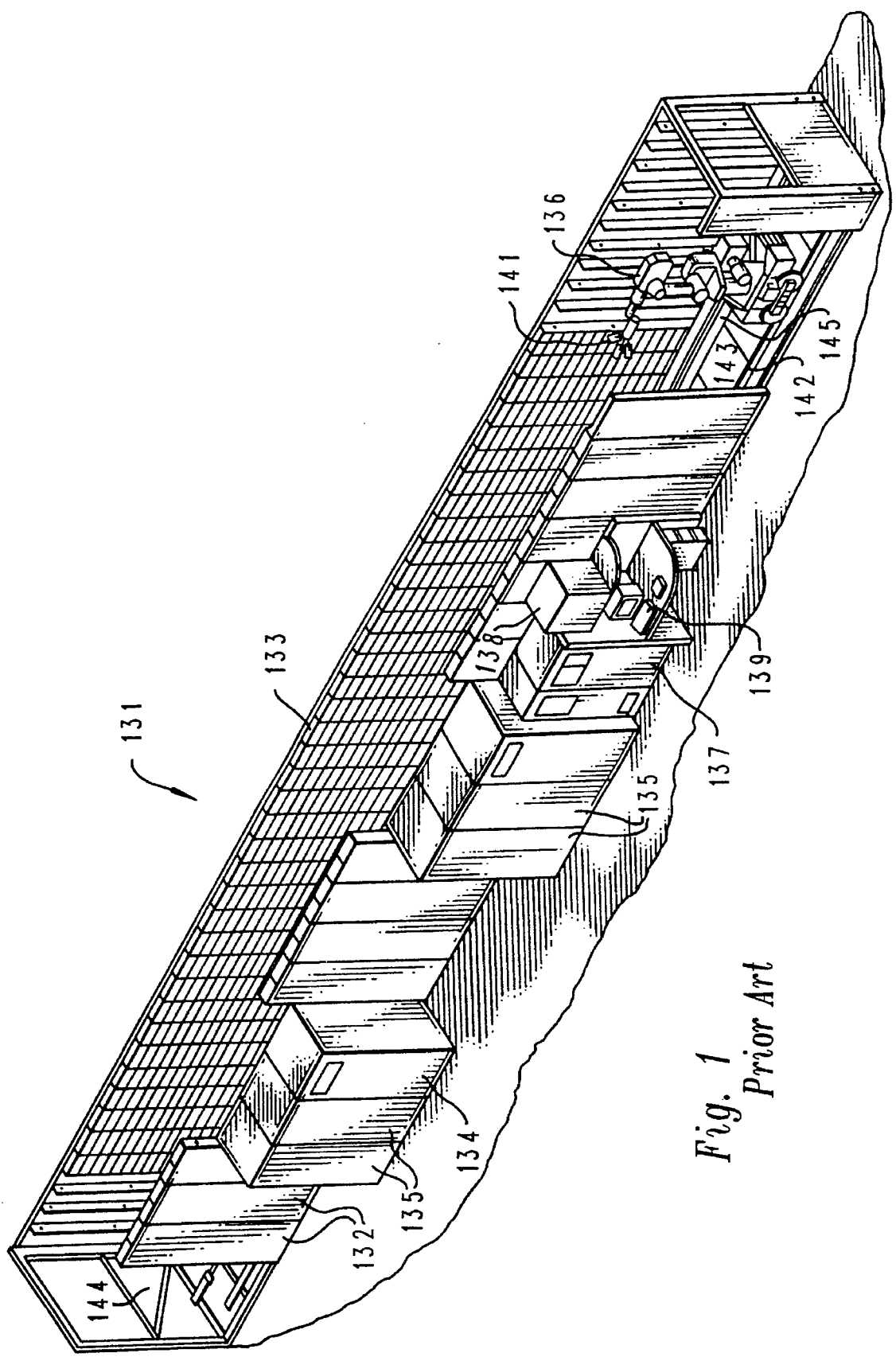
FIG. 1 is a pictorial diagram of an auxiliary storage system comprising an automated storage library having an anthropomorphic robotic picker.

FIG. 1 depicts an automated cartridge library 131 for managing a large database or other data library functions, wherein data is stored on magnetic tapes. Each magnetic tape is housed in a plastic cartridge for protecting the magnetic tape and providing a convenient handling mechanism for a robotic picker. Each cartridge is termed a volume. The automatic cartridge library 131 includes a plurality of modules 132, wherein each module is made from a plurality of magazine holders 133. Each magazine holder consists of a plurality of storage slots, and each storage slot is capable of storing a volume. The automatic cartridge library 131 also includes a plurality of tape units, for example, an IBM 3490 or IBM 3490E Magnetic Tape Subsystem having a controller 134 and tape drives 135. A robot 136, having a gripper/vision assembly 141 attached thereto, travels on an outrigger rail 142 and a guide rail 145 to transfer tape cartridges between the storage slots 133 and the tape drives 135. The robot 136 is anthropomorphic in that it is capable of humanlike motions. A suitable anthropomorphic robot 136 is Model GMF S-10 robot, manufactured by Fanuc, Ltd. Robot 136 is depicted with one gripper/vision assembly 141, but may be provided with two or more such assemblies allowing robot 136 to perform two or more operations at a single location, such as a demount and a mount of volumes from a tape drive 135.

A robot controller 137, attached to the automatic cartridge library 131, commands the robot 136. A service bay 143 for the robot 136, is located at one end of the automated cartridge library 131. The service bay 143 functions as a parking space for the robot 136 when it is not in use or when it is being serviced. An operator access bay 144 is provided at the other end of the automatic cartridge library 131 allowing service personnel to enter. A remote terminal bay 138, accessible internally by the service personnel, is attached to the automated cartridge library 131. A library manager 139 is connected to system 131. Library manager 139 allows an operator to determine system status, promote a tape cartridge mount status, and generally enter external instructions into the automated cartridge library 131. Library manager 139 is provided by an appropriately programmed microcomputer such as an IBM PS/2 personal computer.

The automated cartridge library 131 is expandable for storing additional tape cartridges or improving access time. Additional modules 132 can be added for increasing storage capacity. Additional outrigger rail 142 and guide rail 145 must then be added to allow the robot 136 to travel the additional distance. Also, the operator access bay 144 may be replaced by a second service bay 143 adding a second robot. An input/output port is also available (not shown) to allow an operator to add or remove tape cartridges to and from the automated cartridge library 131. Once a set of volumes have been inserted into the input port, the robot 36 can be instructed to identify the volumes and move them accordingly. Similarly, an operator is prompted to remove volumes previously inserted into the output port by the robot.

Figure 2:
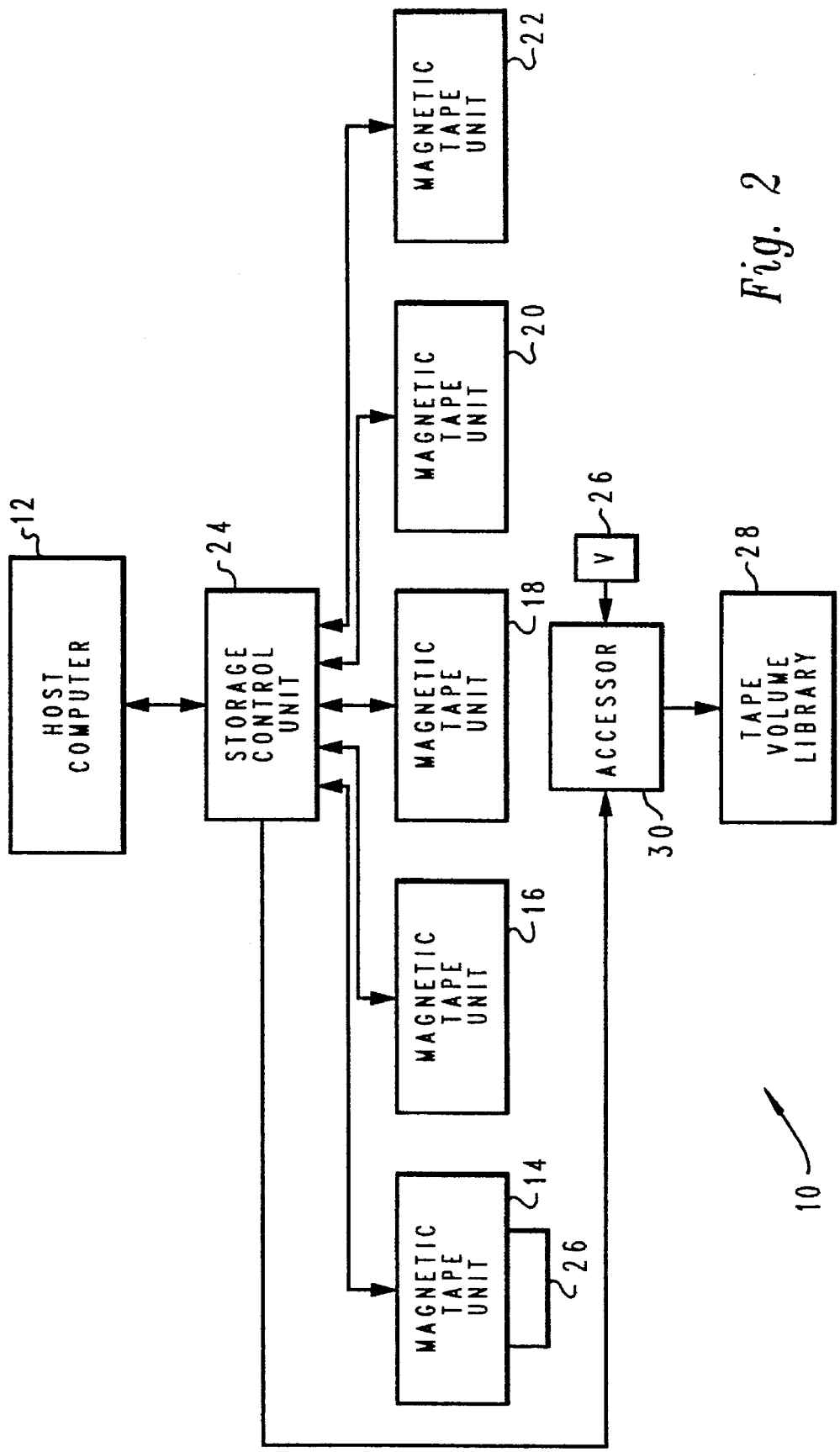
FIG. 2 is a high level block of a data processing system including an auxiliary storage system which may be utilized to implement the method and system of the present invention.

FIG. 2 illustrates in block diagram form a data processing system 10 in which a host computer 12 utilizes a plurality of magnetic tape units 14, 16, 18, 20 and 22 as auxiliary storage devices. Magnetic tape units 14–22 may be the same as tape drives 135 described above with reference to FIG. 1. Host computer 12 may access one of magnetic tape units 14–22 directly or through a storage control unit 24. Magnetic tape units 14–22 are removable media storage devices, meaning data files are written to and read from storage volumes 26, such as magnetic tape cassettes, which may be removed and replaced on the magnetic tape units. Other examples of removable media auxiliary storage devices include floppy disk drives and CD ROM units. Removable volumes 26 are moved between magnetic tape units 14–22 and a tape volume library 28 by an accessor unit 30, such as robot 136, which returns volumes 26 to predetermined locations within tape volume library 28 and handles mounting and threading of volumes 26 on the magnetic tape units.

As removable media, tape volumes 26 associated with an array of volumes must be removed from their respective magnetic tape units 14–22 subsequent to processing. In order to identify a volume 26 as associated with an array, each volume in an array must be uniquely identifiable. In a typical large system environment, a program referred to as a tape management system executed on host computer 12, normally keeps track of the relationships between data files and volumes and may be used to verify that correct volumes are mounted on magnetic tape units allocated for a given application. Tape management implies that volumes 26 in a tape array must be identifiable by a program executing on the host computer 12. As such, it is not possible to hide volumes 26 which are required to create an array from a program as is done in DASD arrays. Tape labeling techniques are well known in the prior art and are used in the present invention to provide a device for identification of an array of volumes.

Figure 3:
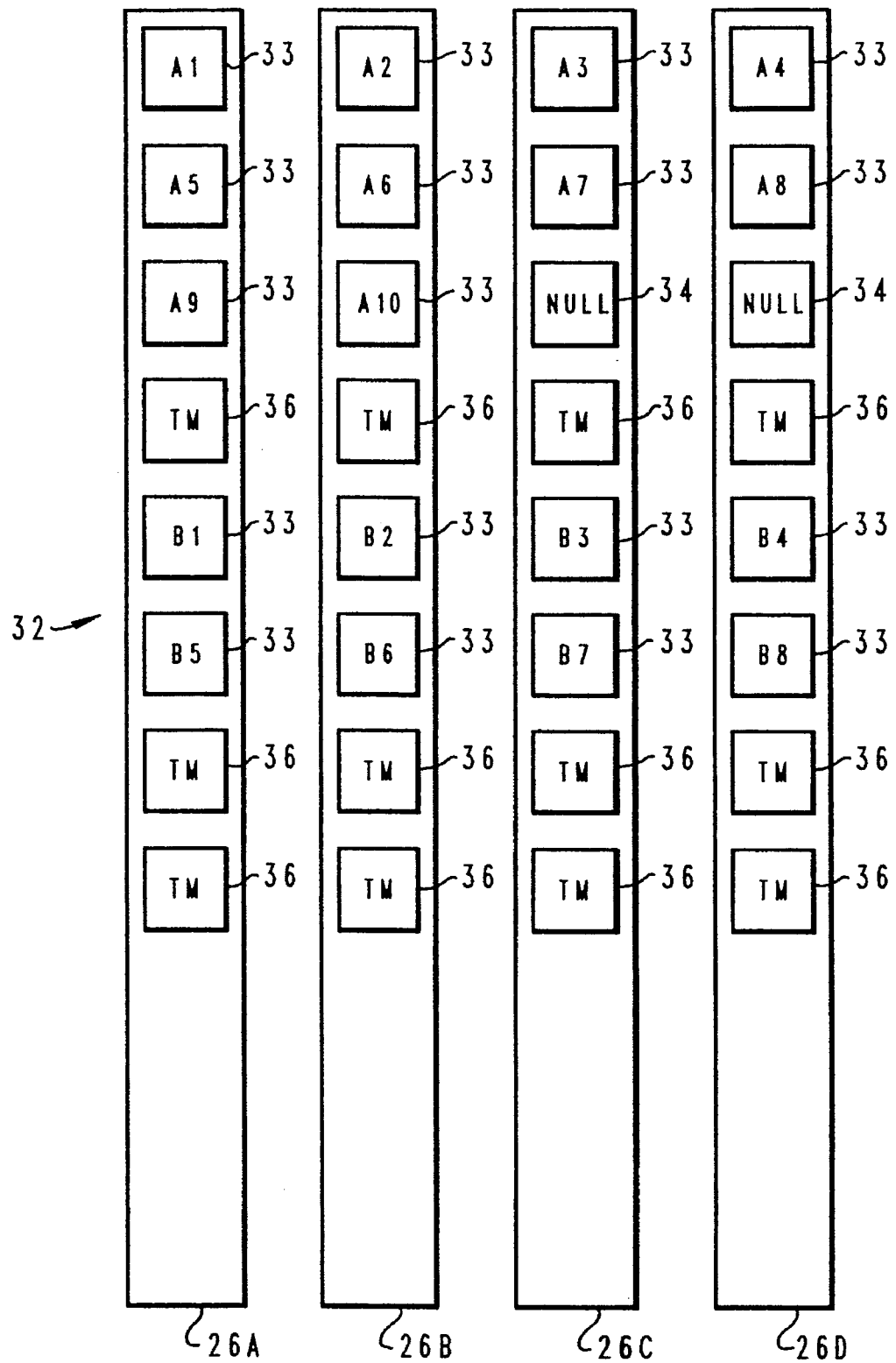
FIG. 3 is a schematic illustration of a data format used for striping data to magnetic tape without redundant parity information.

FIG. 3 illustrates an array 32 of removable volumes 26a–26d used for block or byte striping of a data file over the four removable volumes. File A and file B have been striped to volumes 26a–26d. File A comprises 10 data blocks 33 which are distributed 3 to volume 26a, 3 to volume 26b, 2 to volume 26c and 2 to volume 26d. Because volumes 26c and 26d are short by 1 block each of the number of blocks on volumes 26a and b, the logical locations corresponding to data blocks A9 and A10 in volumes 26a and 26b are filled by null marks 34. A tape mark 36 occurs at the end of each volume to mark the boundary between file A and file B. File B comprises 8 data blocks 33 which are striped across volumes 26a–26d. In this case, the number of blocks is evenly divisible by the number of volumes and accordingly all volumes have the same number of data blocks. File B is the last file on the volumes and accordingly an end of volume marker comprising 2 tape marks 36 is applied to each volume 26a–26d, respectively, following the last data blocks for the file. During a read operation the various blocks shown on the volumes are encountered in sequential order running from top to bottom.

A data file is distributed over an array of volumes in one of two ways. The first method is termed block striping, in which logical blocks, generated by an application, are written to the volumes mounted on the magnetic tape units in round-robin fashion (i.e. logical block A1 on volume 26a, logical block A2 on volume 26b, logical block N−1 on magnetic tape unit or volume N−1, and logical block N on magnetic tape unit N). At the end of the data for a file, a mark called the null mark is written to any volume having fewer than its proportionate share of the number of logical blocks stored over all of the volumes. In other words, if the number of blocks is not divisible by the number of volumes used for storing the blocks some volumes will have fewer blocks by 1 than other volumes. The volumes having fewer blocks receive null marks to bring the count of blocks written or striped to each volume to the same number. A null mark is logically similar to a tape mark in many characteristics and the tape format must support definition of the null mark besides the tape mark.

During a read operation on data striped as blocks, logical blocks are read from the N devices in the same order written. Access on read would typically result in a status condition with associated sense data indicating that a null mark had been encountered.

The second method is termed byte striping. A given logical block can be distributed among N volumes by dividing the logical block into packets of one or more bytes, and sending these groups in round-robin order to the N devices. All of the groups sent for a given logical block to a given device are transferred as a single block to that device. Reading a block implies reconstructing the original logical block from the packets. If records having fewer bytes than devices are supported, a mechanism is required to make sure that at least one packet is recorded on each volume. A solution to this problem is to include the length of the logical block at the beginning of every logical block and then padding the logical block with data so that it is divisible by N times the packet length with no remainder. In other words, there would always be the same number of packets for every device in a given logical block and the length of the logical block would be used to strip the padded bytes after the logical block is reconstructed.

To generate parity for block striping it is required that all logical blocks for a given row of the array be available prior to generating the redundancy stripe and that a redundancy block be generated for any row having data blocks (i.e. a redundancy block is generated for incomplete rows). In addition, the parity block must be exactly as long as the longest block in each row. Redundancy allows loss of an entire volume with reconstruction of the missing blocks of that volume from the parity information and remaining data volumes. Missing blocks (i.e. null marks) are treated as data blocks containing zeroes for parity generation.

In byte striping with redundancy, packets generated for the parity stripe would be the same length as the packets written to the data volumes. Reading a block would imply reconstructing the original block from the packets. In this case, groups are read from the N–1 devices in the same order they are created, with reconstruction of original logical blocks from the groups. If a logical block cannot be read, or if an entire volume is lost, the redundancy stripe is used to reconstruct the groups of bytes for the missing stripe.

Figure 4:
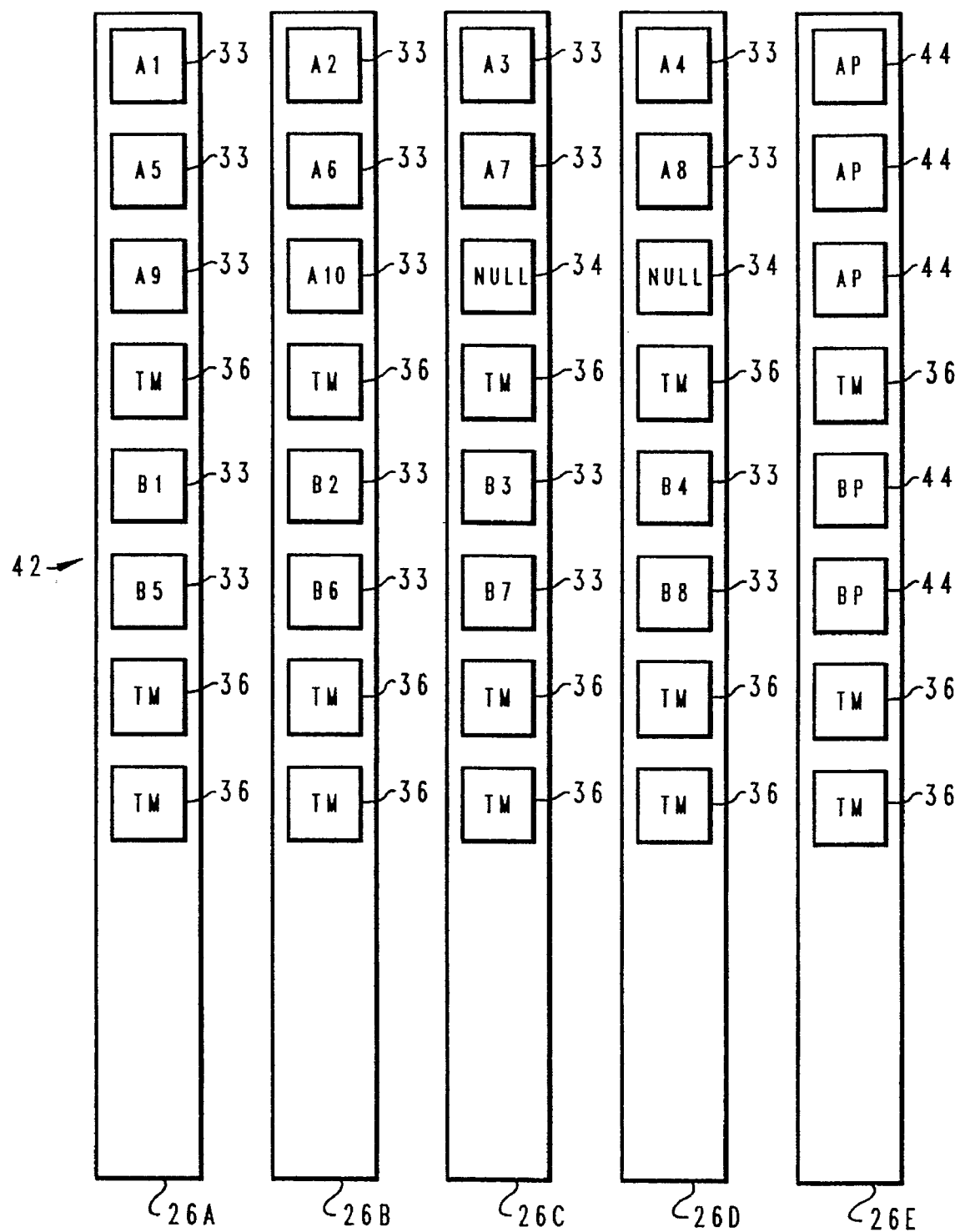
FIG. 4 is a schematic illustration of a data format used for striping data to magnetic tape with redundant parity information.

FIG. 4 is a schematic illustration of an array of volumes 42 having volumes 26a–26e. Array 42 is similar to array 32 save that a fifth volume 26e has been added. Volume 26e comprises three parity blocks 44 for file A and 2 parity blocks 44 for file B. It is common terminology in striping that a group of blocks 33 used for generation of a parity block 44 and that parity block, are referred to collectively as a row. Thus file A has two full rows and a third partial row of blocks.

All data for the Nth file is found in the Nth file position for all volumes in the array. As such, there is no requirement to store additional file numbers in a program which already manages multiple file volumes by maintaining a single file number. In an array, the data for the Nth file begins in the first volume of the array. The program thus needs no additional knowledge of which volume of the array to start reading or writing during an access. To position each volume at the beginning of the Nth file, the same logical block address is used in the locate command issued to all volumes of the array. To locate to anywhere in a data file when data block striping is used, the block must have both the block address and a stripe number or volume order to reference to the correct row and column or stripe of the array. This row and column field information may be incorporated into a new block position identifier which would be applicable to either an arrayed or nonarrayed data position (e.g. a nonarrayed position would always have the same stripe number).

Although it is desirable to use equal length tapes, it is not required, and due to differences in quality of tape between particular volumes may not be possible. The invention handles the possibility that one tape will have less storage capacity that the others, perhaps due to medium defects. Some magnetic tape units provide a physical location index as part of a logical block identifier. In this case, the block striping system should be designed so that the physical location index is monotonically increasing in the logical forward direction. Given this characteristic, the program can use a block position indicator to position all of the volumes by using the row and column technique described above and by additionally taking the smallest physical location index obtained from all of the volumes in an array as the physical location index to save in the block position indicator. As such, the search for the desired logical block will begin roughly at the position of the logical block in the column of the array on which the applicable row is closest to the beginning of the tape. The mechanism used to position to a file or to a block requires the same amount of data independent of the width of the array. Thus no significant demands for data capacity beyond what a single nonarrayed volume requires are made for the tape management system. The support of multiple volume data sets on tapes has, in the prior art, created the need to maintain a relationship between one or more data sets in one or more volumes. This feature may be exploited to support an array of tapes simply by knowing how wide the array is. The ordered set of volumes associated with the data set or file could then be monitored and processed as an array.

Block striping may be implemented in software or by hardware modification of magnetic tape units 14. Byte striping with redundancy may be best performed in hardware outside of host computer 12, such as is done in some RAID systems. Implementation in software would be advantageous in maintaining flexibility in limiting capitalization costs.

Figure 5A:
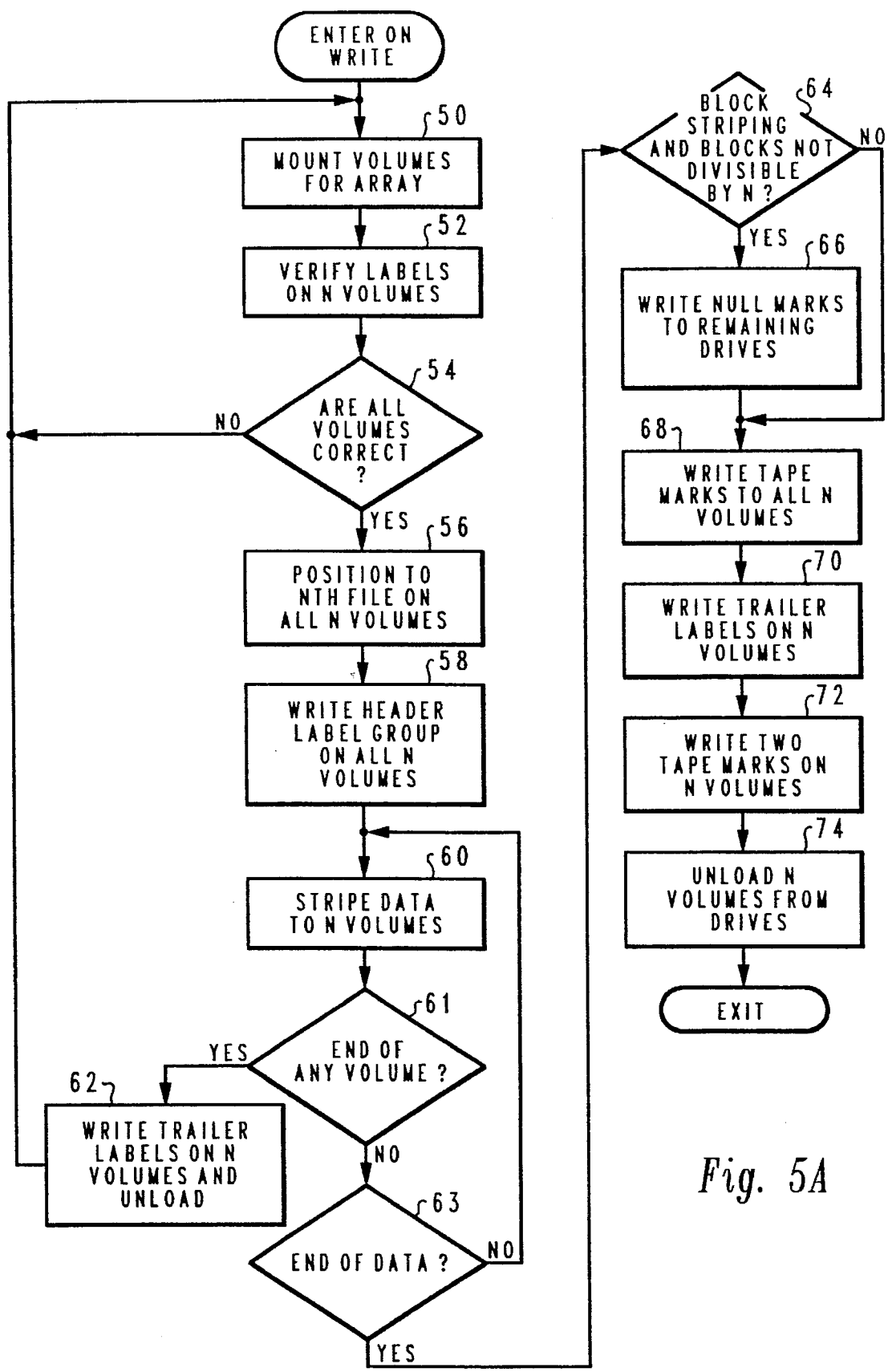
FIGS. 5A and 5B are high level logical flow charts of a process executed by a storage control unit or a host computer for striping of data on removable volumes used with an auxiliary storage system.
Figure 5B:
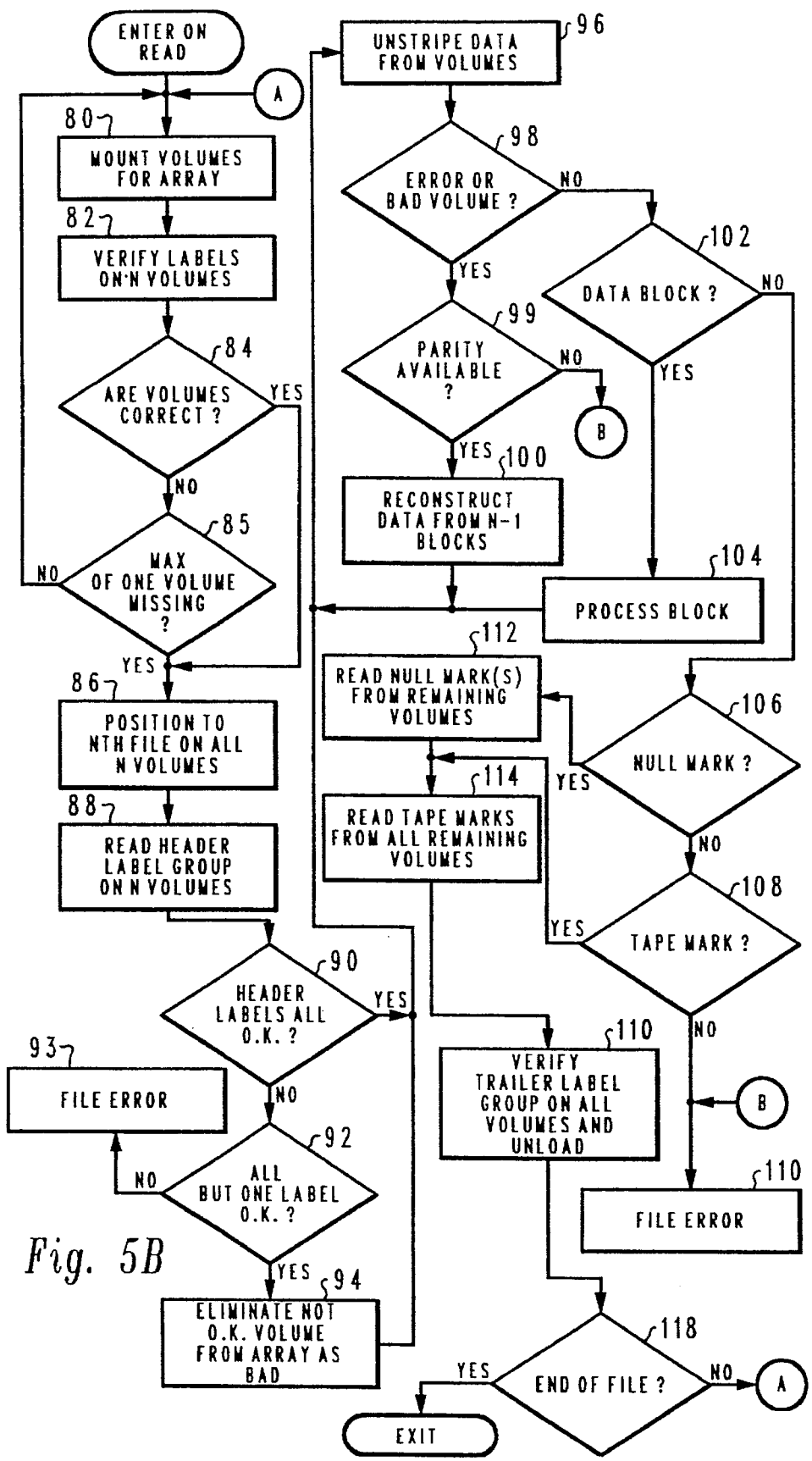

FIGS. 5A and 5B are logical flow charts of a software process executed by a storage control unit 24 or host computer 12 for write and read operations, respectively. The write operation is entered with step 50 where an accessor 26 is directed to mount N volumes associated with an array on magnetic tape units. Next, at step 52, labels, if present, on the N volumes are processed. Where labels are present, step 54 is processed to validate volumes as correct for the array and in the correct order on the magnetic tape units 14–22. Determination of one or more invalid volumes has been mounted results in the invalid branch being followed back to step 50. If the volumes are misordered this branch may be followed for remounting of the volumes, or a dynamic adjustment for the incorrect order may be taken into account for reconstruction or striping of blocks from or to the volumes.

After validation of mounting of volumes as being correct, step 56 is executed to position all volumes to the Nth file. Next, at step 58, a header label group for the file is written to all volumes in the array. At step 60 data (blocks or bytes) and parity information, if used, are striped to the N volumes. If, during striping the end of any volume is encountered (as detected at step 61), all volumes are written with trailer labels and unloaded from the drives (step 62). From step 62 processing is returned to step 50 to mount follow up volumes for the file.

Upon completion of striping of all data for a file, step 63 provides for exit from striping along its YES branch to step 64. At step 64 it is determined if block striping was used and if the total number of non-parity blocks striped was not evenly divisible by the number N of volumes or, if parity is used, by N−1. Where both conditions are satisfied an empty block location must be filled in each of one or more columns of the array. Step 66 provides for filling the empty block locations with null marks. After step 66, or following the NO branch from step 64, step 68 is executed in preparation to removing the volumes from the drives are carried out. Step 68 is executed to write tape marks to all N volumes. Next, step 70 writes trailer labels on the N volumes. At step 72 two tape marks on written on each of the N volumes. At step 74 the N volumes are unloaded from the drives. The process is then exited.

A read operation begins identically to a write operation. The read operation is entered with step 80 where an accessor 26 is directed to mount N volumes associated with an array on magnetic tape units. Next, at step 82, labels, if present, on the N volumes are processed. Where labels are present, step 84 is processed to validate volumes as correct for the array and in the correct order on the magnetic tape units 14–22. Determination of one or more invalid volumes has been mounted may result in the invalid branch being followed back to step 50 for a retry. Step 85 may be placed in the invalid branch if parity is available for the array, in which case operation may continue less one volume of the array. If only one volume is missing or incorrectly mounted the YES branch from step 85 is taken to step 86.

Once the correct volumes have been mounted, step 86 is executed to place all N volumes at the Nth file. Next, at step 88, all header label groups on the N volumes are read. If at step 90 it is determined that all header labels are as expected, unstriping of the data may begin (step 96). If the labels are not all as expected, it is determined if all but one of the labels meets expectations (step 92). If this is the case data recovery may proceed using error recovery techniques. Step 94 eliminates the volume having the unexpected label and processing advances to step 96. If more than one label fails processing is aborted with indication of system error (step 93).

Unstriping of data progresses block by block. Each block is examined for error and to determine if it comes from a volume previously marked bad (step 98). If a (regular data) volume is bad or error has occurred, step 99 is executed to determine if parity information is available for use in recovery of the lost data. If it is not, file error is indicated (step 110). If parity information and all of the other data blocks for the current row are available, step 100 is executed to reconstruct the data from the bad volume or in which error occurred upon recovery. After step 100 processing is returned to step 96. If no error or bad volume is indicated for a row, step 102 determines if the block is a data (or parity block). If YES the block is processed at step 104 in accord with the coding scheme to recover the data and processing is returned to step 96.

If a block is determined at step 102 not to have been a data block, processing advances to step 106 to determine if the block was a null mark. If not a null mark, step 108 is executed to determine if it is a tape mark. If the block is not a tape mark an error condition has arisen resulting in abortion of the operation with step 110. Detection of a null mark results in step 112 being executed to read the null marks from the remaining drives. Following step 112, or after detection of a tape mark, step 114 is executed to read the tape marks from the remaining volumes. Next step 116 is executed to verify that the trailer label groups on all volumes is correct and the volumes are unloaded. If the file extends to other volumes step 118 returns processing to step 80 to mount the appropriate volumes. Otherwise, the process is exited.

Figure 6:
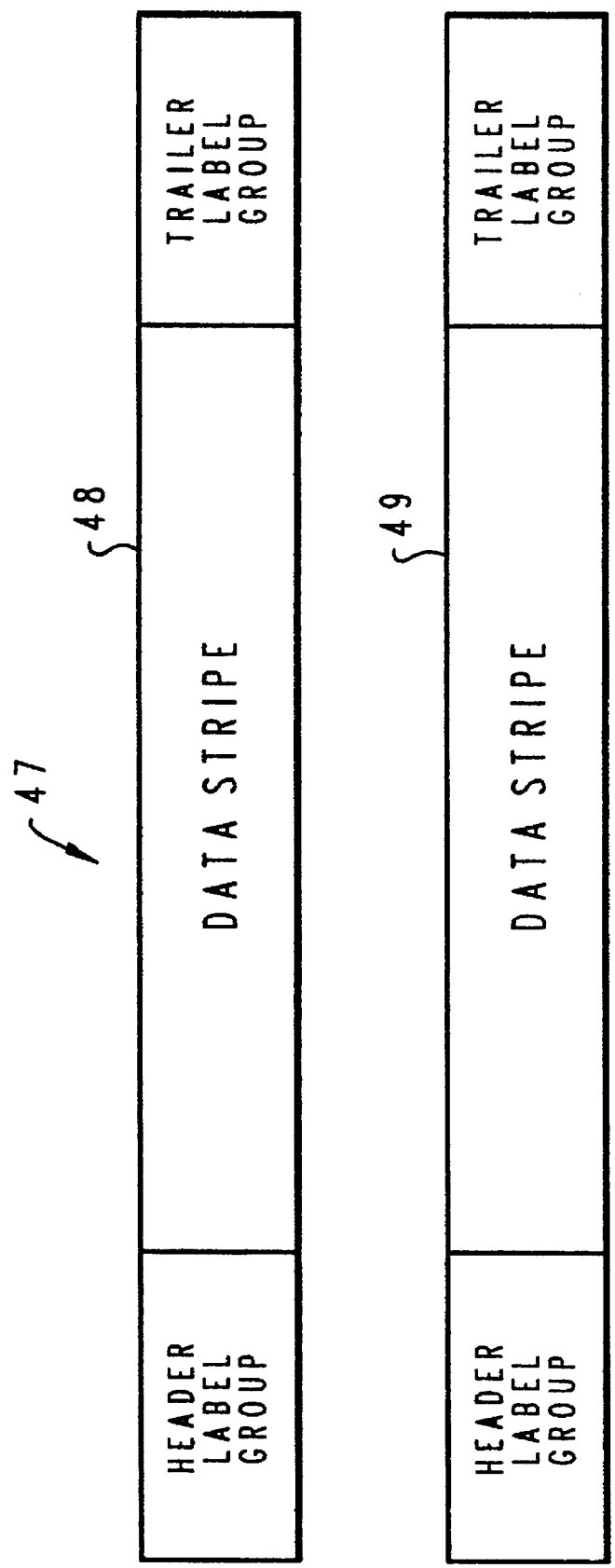
FIG. 6 illustrates a labeling format for use with volumes of an array.

FIG. 6 illustrates a file 47 written as two data stripes 48 and 49 to parallel volumes. Data stripes 48 and 49 each include a label header group and a label trailer group which among other things identify the file to which the data stripes belong and the order in the array of the data stripes. The label header groups and the label trailer groups are, however, not striped data but complete. For the purpose of supporting tape arrays, the structure of the labels for volume labels as for each volume in the array would have its own set of labels which would basically contain the same information about the data set on that stripe of the array. Volume information, such as order, would also be required. The program is responsible for determining which volumes are required to access a given arrayed file and additionally is responsible for maintaining which volumes are utilized for array purposes. Data striping is unchanged whether a label is used or not used. If files can extend across volumes, additional volume information would be required to define this possibility and the order of the volumes.

Various information can be included in the labels. A stripe width field may be used to define the number of stripes in the array. A stripe number field containing the stripe number associated with the volume in the array would assist the program in determining the proper order to access the data. A next stripe volume identifier which would give a volume ID or volume serial number in the next row of the array in the increasing stripe number. For the last row of the array, this would point back to the volume in the first row of the array. Such a field would allow verification by the program that a complete set of arrayed volumes was available. If a volume were lost, the pointers in combination with the stripe width field would determine a complete set. A previous volume identifier which would give a volume ID or volume serial number of the previous volume in the column of the array for the stripe being inspected. This could be used to verify that linkage from a prior volume to the current volume was performed properly. This field would have the same utility in a nonstriped multiple volume application. A striping technique field would determine in the method used for striping (e.g. block striping, byte striping etc.). For redundancy versions the assumption could be made that there was only a single redundancy volume and that it was always the last stripe of the array. For byte striping an additional field might be required to define the number of bytes in a packet for reconstruction.

The present invention provides for data striping on magnetic tape units which is compatible with the removable nature of tape cassettes, is consistent with standard tape file and label formats and is further compatible with file and record access methods on magnetic tape units. Bandwidth is improved so that a RAID type of array of DASD devices may be backed up at full speed for the DASD devices.

While the invention has been particularly shown and described with reference to a preferred embodiment, it will be understood by those skilled in the art that various changes in form and detail may be made therein without departing from the spirit and scope of the invention.

What is claimed is:

1. An auxiliary data storage system, comprising:

a plurality of removable media data storage units;

an array of removable volumes for mounting on the removable media data storage units;

means for mounting the array of removable volumes on the plurality of removable media data storage units;

means for accessing the array at equivalent logical locations on each of the removable volumes of the array for storage or retrieval of a data file distributed across said array of removable volumes;

means, responsive to access of an array of removable volumes, for striping data to the removable volumes by bytes with the bytes being organized into at least a first logical packet for each volume and with the logical packet for some volumes being padded if insufficient data exists to complete the logical packet; and means, responsive to access of an array of removable volumes, for striping data to the removable volumes by logical blocks and null marks, wherein null marks are placed in a subset of the volumes if a total number of logical blocks striped to said array of removable volumes is not evenly divisible by a total number of volumes receiving striped data.

2. An auxiliary data storage system as set forth in claim 1, and further comprising:

means responsive to exhaustion of storage capacity of a removable volume from an array during access of the array for a write operation for marking all removable volumes for the array for an end of volume condition.

3. An auxiliary data storage system as set forth in claim 2, wherein each array includes a removable volume for redundant information and the auxiliary storage system further comprises:

means for generating and writing redundant information onto the removable volume beginning at an equivalent location for the removable volume.

4. An auxiliary data storage system as set forth in claim 1, wherein each removable volume further comprises:

a label identifying the array to which the removable volume belongs and an order in the array.

5. An auxiliary data storage system as set forth in claim 4, wherein the label includes:

a label header and a label trailer; and the means for mounting includes means for determining if a mounted removable volume is a member of a requested array.

6. An auxiliary data storage system as set forth in claim 5, and further comprising:

means responsive to exhaustion of storage capacity of a removable volume from an array during access of the array for a write operation for marking all removable volumes for the array for end of volume.

7. An auxiliary data storage system as set forth in claim 5, wherein the label on each removable volume belonging to the array is not striped.

8. An auxiliary data storage system as set forth in claim 7, wherein each array includes a removable volume for redundant information and the auxiliary storage system further comprises:

means for generating and writing redundant information by packets to the removable volume beginning at an equivalent location.

9. A method of storing and recovering a data file on a plurality of the removable media data storage units, the method comprising:

mounting an array of removable volumes on the removable media data storage units;

accessing the array at equivalent logical locations on each of the removable volumes of the array for storage or retrieval of a data file distributed across said array of removable volumes;

responsive to access of an array of removable volumes and selection by a user or host of distributing data by bytes, striping data to the removable volumes by bytes with the bytes being organized into at least a first logical packet for each volume and with the logical packet for some volumes being padded if insufficient data exists to complete the logical packet; and responsive to access of an array of removable volumes and selection by a user or a host of a logical block organization, striping data to the removable volumes by logical blocks and null marks, wherein null marks are placed in a subset of the volumes if a total number of logical blocks striped to said array of removable volumes is not evenly divisible by a total number of volumes receiving striped data.

10. The method of claim 9, and further comprising:

responsive to exhaustion of storage capacity of a removable volume from an array during access of the array for a write operation, marking all removable volumes for the array for end of volume.

11. The method of claim 10, and further comprising:

striping redundant information to a removable volume of the array.

12. The method of claim 11, further comprising:

marking each removable volume for an array with an intact label identifying the array to which the removable volume belongs and an order in the array.

13. The method of claim 12, and further comprising:

upon mounting of a removable volume, determining if the removable volume is a member of a requested array.

14. The method of claim 13, and further comprising:

responsive to exhaustion of storage capacity of a removable volume from an array during access of the array for a write operation, marking all removable volumes for the array for end of volume.

15. The method of claim 14, and further comprising:

striping redundant information to a removable volume of the array.

16. A data processing system, comprising:

a host computer;

a library of removable volumes for storage of data;

a plurality of auxiliary memory drive units for accessing removable volumes; and an array of removable volumes within the library having file format conventions and labels compatible with file format conventions of the library, said array of removable volumes being striped with data for the host computer with data for a given file starting at a first volume of the array and for each volume on an identical block index, wherein said given file begins at a same sequential file on all volumes and a starting location for said given file is identified by a single location pointer also used for volumes not belonging to an array.

17. A data processing system as set forth in claim 16, and further comprising:

identification for a volume of the array being accessible upon access of the volume after placement on an auxiliary memory drive unit without accessing of the remaining volumes of the array.

18. A data processing system as set forth in claim 16, and further comprising:

a given file striped to the array ends on a single boundary across all volumes of the array, with null marks filling out volumes not receiving as many logical blocks as other volumes.

\* \* \* \* \*